(12) United States Patent
Sudha et al.

(10) Patent No.: US 9,239,948 B2
(45) Date of Patent: Jan. 19, 2016

(54) FEATURE DESCRIPTOR FOR ROBUST FACIAL EXPRESSION RECOGNITION

(71) Applicant: Samsung Electronics Co., Ltd., Suwon-si (KR)

(72) Inventors: Velusamy Sudha, Bangalore (IN); Anand Balasubramanian, Bangalore (IN); Gopalakrishnan Viswanath, Bangalore (IN); Moogi Pratibha, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 369 days.

(21) Appl. No.: 13/938,371

(22) Filed: Jul. 10, 2013

(65) Prior Publication Data
US 2014/0023269 A1    Jan. 23, 2014

(30) Foreign Application Priority Data

Jul. 17, 2012 (IN) .......................... 2885/CHE/2012
May 15, 2013 (IN) .......................... 2885/CHE/2013
Jul. 3, 2013 (KR) ........................ 10-2013-0077825

(51) Int. Cl.
*G06K 9/00* (2006.01)
*G06K 9/46* (2006.01)
(52) U.S. Cl.
CPC ........ *G06K 9/00302* (2013.01); *G06K 9/00281* (2013.01); *G06K 9/00308* (2013.01); *G06K 9/4642* (2013.01)
(58) Field of Classification Search
USPC ................................................. 382/118, 170
See application file for complete search history.

(56) References Cited

U.S. PATENT DOCUMENTS

| | | | | |
|---|---|---|---|---|
| 7,450,126 B2* | 11/2008 | Marschner | ............... | G06T 13/40 345/419 |
| 7,953,254 B2* | 5/2011 | Seo | .................... | G06F 17/30032 382/118 |
| 8,798,374 B2* | 8/2014 | Bartlett | .............. | G06K 9/00335 382/118 |
| 8,861,805 B2* | 10/2014 | Hwang | ........................ | 382/115 |
| 9,117,105 B2* | 8/2015 | Da | ..................... | G06K 9/00214 |
| 2006/0192785 A1 | 8/2006 | Marschner et al. | | |
| 2008/0101660 A1 | 5/2008 | Seo | | |
| 2009/0153554 A1 | 6/2009 | Lim et al. | | |
| 2010/0182325 A1 | 7/2010 | Cederwall et al. | | |
| 2010/0296706 A1* | 11/2010 | Kaneda | .............. | G06K 9/00281 382/118 |
| 2011/0038547 A1* | 2/2011 | Hill | .................... | G06K 9/00281 382/195 |
| 2012/0101735 A1 | 4/2012 | Velusamy et al. | | |
| 2015/0003672 A1* | 1/2015 | Sarkis | ................ | G06K 9/00288 382/103 |
| 2015/0036934 A1* | 2/2015 | Movellan | ........... | H04N 5/23219 382/197 |

FOREIGN PATENT DOCUMENTS

KR    10-2004-0007921    1/2004

* cited by examiner

*Primary Examiner* — Ishrat I Sherali
(74) *Attorney, Agent, or Firm* — NSIP Law

(57) ABSTRACT

A method and system for generating a feature descriptor for robust facial expression recognition pre-processes a facial image using a Gaussian filter to smooth the facial image. Then, gradient based images at M scales and N orientations are generated from the pre-processed facial image. Further, a portion of an image corresponding to each action unit is selected from each of the gradient based images. Thereafter, appearance of at least one facial event in the selected portion of the image is captured. Also, a geometry of the at least one facial event in the selected portion of image is determined to obtain a feature descriptor for each action unit for robust facial expression recognition.

17 Claims, 4 Drawing Sheets

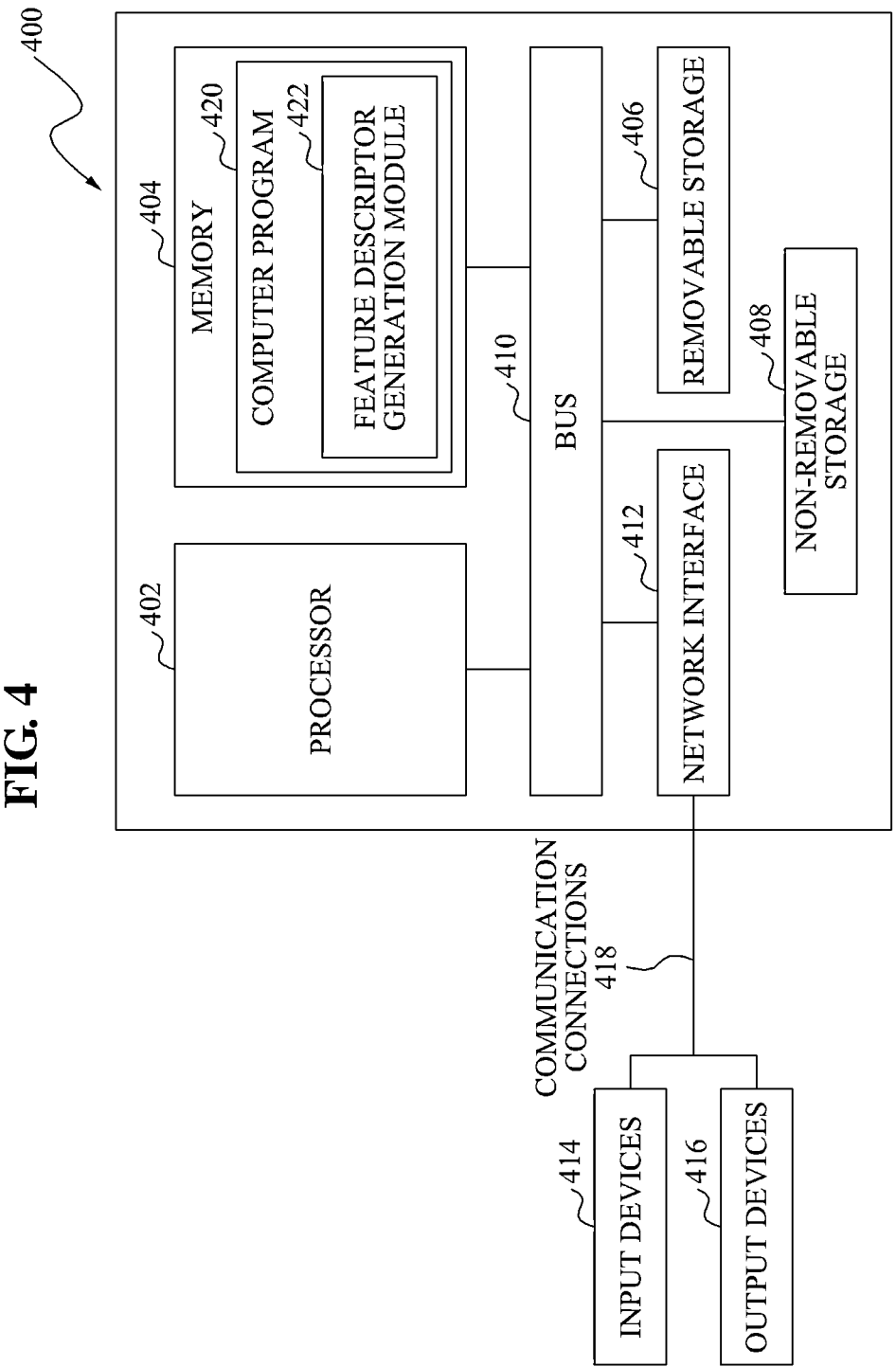

FEATURE DESCRIPTOR FOR ROBUST FACIAL EXPRESSION RECOGNITION

CROSS-REFERENCE TO RELATED APPLICATIONS

This application claims the priority benefit under 35 USC § 119(a) of Indian Patent Application No. 2885/CHE/2012, filed on Jul. 17, 2012, and Indian Patent Application No. 2885/CHE/2013, filed on May 15, 2013, in the Intellectual Property India, and Korean Patent Application No.10-2013-0077825, filed on Jul. 3, 2013 in the Korean Intellectual Property Office, the disclosures of which are incorporated herein by reference for all purposes

BACKGROUND

1. Field

The following description relates to image processing, and more particularly, relates to a method and apparatus for generating feature vectors for facial expression recognition.

2. Description of the Related Art

Facial expression is produced by activation of facial muscles which are triggered by nerve impulses. In image processing, facial expression recognition from visual cues is a technique of identifying a facial expression of an individual from a digital image or a video frame. A facial expression recognition system is generally employed to predict facial expression specific information based on a facial expression on a face of an individual. Typically, facial expression specific information is represented through a set of facial muscle action units (AUs). For example, when a new test image arrives, the facial expression recognition system first localizes facial muscle shapes, represents the localized facial muscle shapes using a feature descriptor, and classifies the representation against pre-stored AU models to obtain a facial expression on the face.

One of the challenges for accurate facial expression recognition is generating efficient and discriminative feature descriptors that are resistant to large variations of illumination, pose, face expression, aging, face misalignment, and other factors. One of the currently well used techniques comprises generating a feature descriptor by applying two-dimensional spatial filter banks that respond to edges and shapes at various orientations and scales. Another currently known technique generates a feature descriptor based on histogram of patterns derived from a relative change in parameters of local patches. In yet another currently known technique, relative distances of facial anchor points are coded as features. Some of the known techniques use a combination of the above techniques to generate feature descriptors. However, none of the currently known techniques are capable of generating efficient and discriminative feature descriptors.

SUMMARY

The following description relates to a method of generating a feature descriptor for facial expression recognition, the method including generating a plurality of gradient based images with different scales and orientations from a facial image, selecting a portion of an image corresponding to each action unit in each of the plurality of gradient based images, determining, by a processor, an appearance of at least one facial event in the selected portion of the image using coded appearance values, and determining a geometry of the at least one facial event in the selected portion of the image using a spin wheel structure to obtain a feature descriptor for each action unit for facial expression recognition.

The determining the appearance of the at least one facial event in the selected portion of the image may include computing a coded appearance value for each pixel in the selected portion of the image based on relative intensity of each pixel with respect to neighboring pixels, wherein the code assigned to each pixel is indicative of the appearance of the at least one facial event.

The determining the geometry of the at least one facial event in the selected portion may include dividing the selected portion into a pre-defined number of blocks of different shapes, constructing a spin wheel structure in each of the blocks, wherein the spin wheel structure may include a plurality of segments, and wherein each of the segments may include a set of pixels belonging to each respective block, generating a histogram for each of the segments in each spin wheel structure in the selected portion of the image based on the codes assigned to the set of pixels in each segment, and generating a concatenated histogram for the portion of the image from the histograms associated with the segments in each spin wheel structure in the selected portion of the image.

The method may include pre-processing the facial image using a Gaussian filter.

The computing the code for each pixel in the selected portion of the image may include computing a code for each pixel in the selected portion of the image by integrating relative information around each pixel.

The following description relates to an apparatus including a processor, and a memory coupled to the processor, wherein the memory may include a facial descriptor generation module, wherein the facial descriptor generation module instructs the processor to perform a method including generating a plurality of gradient based images with different scales and orientations from a facial image, selecting a portion of an image corresponding to each action unit in each of the plurality of gradient based images, determining an appearance of at least one facial event in the selected portion of the image using coded appearance values, and determining a geometry of the at least one facial event in the selected portion of the image using a spin wheel structure to obtain a feature descriptor for each action unit for facial expression recognition.

The method may further include computing a coded appearance value for each pixel in the selected portion of the image based on relative intensity of each pixel with respect to neighboring pixels, wherein the code assigned to each pixel is indicative of the appearance of the at least one facial event.

The method may further include dividing the selected portion into a pre-defined number of blocks of different shapes, constructing a spin wheel structure in each of the blocks, wherein the spin wheel structure may include a plurality of segments, and wherein each of the segments may include a set of pixels belonging to each respective block, generating a histogram for each of the segments in each spin wheel structure in the selected portion of the image based on the codes assigned to the set of pixels in each segment, and generating a concatenated histogram for the portion of the image from the histograms associated with the segments in each spin wheel structure in the selected portion of the image.

The method may further include pre-processing the facial image using a Gaussian filter.

The method may further include computing a code for each pixel in the selected portion of the image by integrating relative information around each pixel.

The following description relates to a non-transitory computer-readable storage medium having executable program stored therein, that when executed by a processor of a computing device, cause the computing device to perform the method including generating a plurality of gradient based images with different scales and orientations from a facial image, selecting a portion of an image corresponding to each action unit in each of the plurality of gradient based images, determining an appearance of at least one facial event in the selected portion of the image using coded appearance values, and determining a geometry of the at least one facial event in the selected portion of the image using a spin wheel structure to obtain a feature descriptor for each action unit for facial expression recognition.

The method may further include computing a coded appearance value for each pixel in the selected portion of the image based on relative intensity of each pixel with respect to neighboring pixels, wherein the code assigned to each pixel is indicative of the appearance of the at least one facial event.

The method may further include dividing the selected portion into a pre-defined number of blocks of different shapes, constructing a spin wheel structure in each of the blocks, wherein the spin wheel structure may include a plurality of segments, and wherein each of the segments may include a set of pixels belonging to each respective block, generating a histogram for each of the segments in each spin wheel structure in the selected portion of the image based on the codes assigned to the set of pixels in each segment, and generating a concatenated histogram for the portion of the image from the histograms associated with the segments in each spin wheel structure in the selected portion of the image.

The method may further include pre-processing the facial image using a Gaussian filter.

The method may further include computing a code for each pixel in the selected portion of the image by integrating relative information around each pixel.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the example embodiments, taken in conjunction with the accompanying drawings of which:

FIG. 4 illustrates a computing device for implementing one or more embodiments.

DETAILED DESCRIPTION

The example embodiments provide a method and system for generating a feature descriptor for robust facial expression recognition. In the following detailed description of the embodiments, reference is made to the accompanying drawings that form a part hereof, and in which are shown by way of illustration, specific embodiments in which the embodiments may be practiced. These embodiments are described in sufficient detail to enable those skilled in the art to practice the embodiments, and it is to be understood that other embodiments may be utilized and that changes may be made without departing from the scope of the example embodiments. The following detailed description is, therefore, not to be taken in a limiting sense, and the scope of the example embodiments is defined only by the appended claims.

Figure 1:
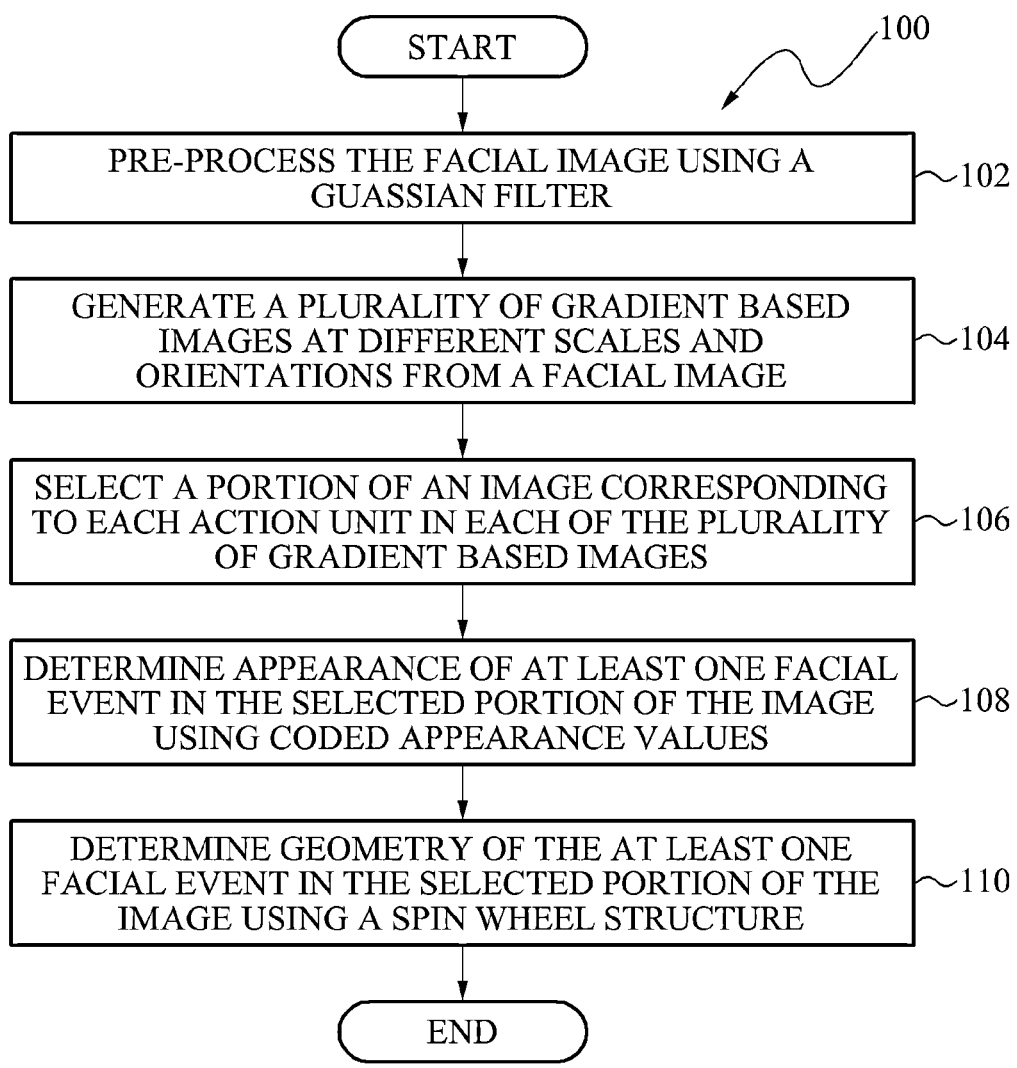
FIG. 1 illustrates a method of generating a feature descriptor for robust facial expression recognition, according to example embodiments.

FIG. 1 illustrates a method 100 of generating a feature descriptor for robust facial expression recognition, according to example embodiments. In operation 102, a facial image is pre-processed using a Gaussian filter. The facial image is pre-processed to smooth the facial image. In some embodiments, the facial image may be pre-processed by a Gaussian filter with a sigma to handle noise as relative orders are sensitive to noise.

In operation 104, gradient based images at M scales and N orientations are generated from the pre-processed facial image. For example, the gradient based images at M scales and N orientations are generated by applying filters such as a Gabor filter or Haar filter, for example. The gradient based images helps to capture a magnitude of response of different facial events at M scales and N orientations. In operation 106, a portion of an image corresponding to each action unit is selected from each of the gradient based images. For example, a portion of all the gradient based images for each action unit is selected for generation of a feature descriptor by performing the following operations. This procedure is repeated for all action units defined by the Facial Action Coding System (FACS).

In operation 108, an appearance of at least one facial event in the selected portion of the image is captured. In some embodiments, a coded appearance value is computed for each pixel in the selected portion of the image, based on a relative intensity of each pixel with respect to neighboring pixels. In these embodiments, the code is computed for each pixel by integrating relative information around each pixel. The code associated with each pixel is a measure of appearance of the at least one facial event at the selected portion of the image. In an exemplary implementation, the code is computed for each pixel in the selected portion of the image using a Local Binary Pattern (LBP) filter. It is appreciated that the Local Binary Pattern filter and its use is well known to a person having ordinary skill in the art.

In operation 110, a geometry of the at least one facial event in the selected portion of image is determined. In some embodiments, the geometry of the at least one facial event is computed using a spin wheel structure. The geometry and appearance of the captured facial event would yield a feature descriptor of the facial event for robust facial expression recognition. The detailed steps involved in generating a facial descriptor of the facial event in the selected portion of image are described in FIG. 2.

Figure 2:
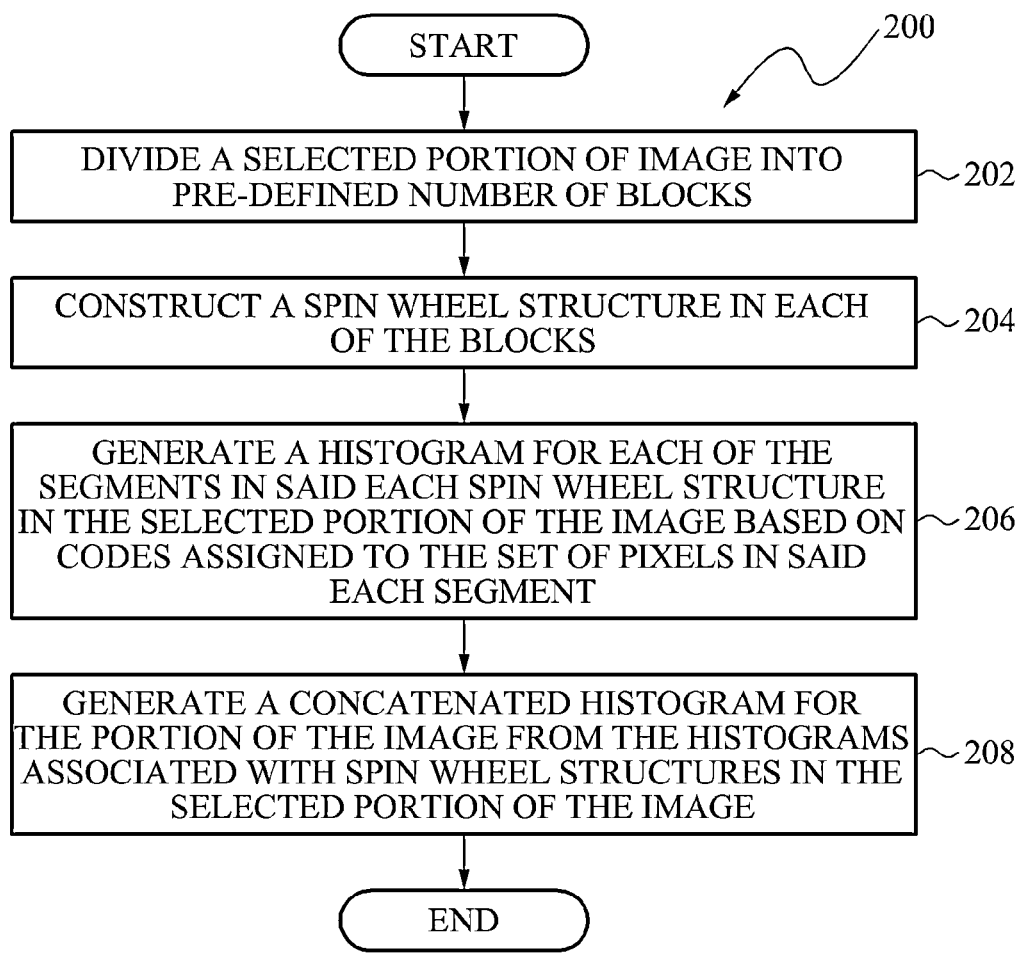
FIG. 2 illustrates a method of computing geometry of facial events in a selected portion of an image using spin wheel structure, according to example embodiments.

FIG. 2 illustrates a method 200 of computing geometry of facial events in the selected portion of image using a spin wheel structure, according to example embodiments. In operation 202, the selected portion of the image is divided into a pre-defined number of blocks. The selected portion of the image is divided into blocks to localize facial regions with sizes appropriate to encode only relevant details. In one exemplary implementation, the size of each block is designed to be a function of scale (M scales) used to generate gradient based images.

In operation 204, a spin wheel structure with P radial distances and Q angles is constructed in each of the blocks. A spin wheel structure in each block includes a plurality of segments, and each of the segments includes a set of pixels belonging to respective block. In operation 206, a histogram for each of the segments in each spin wheel structure is generated using codes assigned to the set of pixels in each segment.

In operation 208, a concatenated histogram for the portion of the image is generated from the histograms associated with each spin wheel structure in the selected portion of the image. For example, if the portion of the image is divided into ten blocks, then ten spin wheel structures are obtained. If each spin wheel structure comprises sixteen segments, then sixteen histograms are generated based on codes assigned to the pixels in each respective segment. Thereafter, sixteen histograms for each spin wheel structure are concatenated to form a concatenated histogram for each spin wheel structure. Thus, ten different histograms are obtained. Finally, the ten different histograms associated with each spin wheel structure are concatenated to obtain a final histogram for the portion of image selected for a particular action unit. Thus, the final histogram is representation of a facial descriptor for the facial image. Above, an image divided to form ten spin wheel structures, with each structure having sixteen segments is described. However, an image may be divided into any number of spin wheel structures, and each spin wheel structure may be divided into any number of segments, as appropriate.

Figure 3:
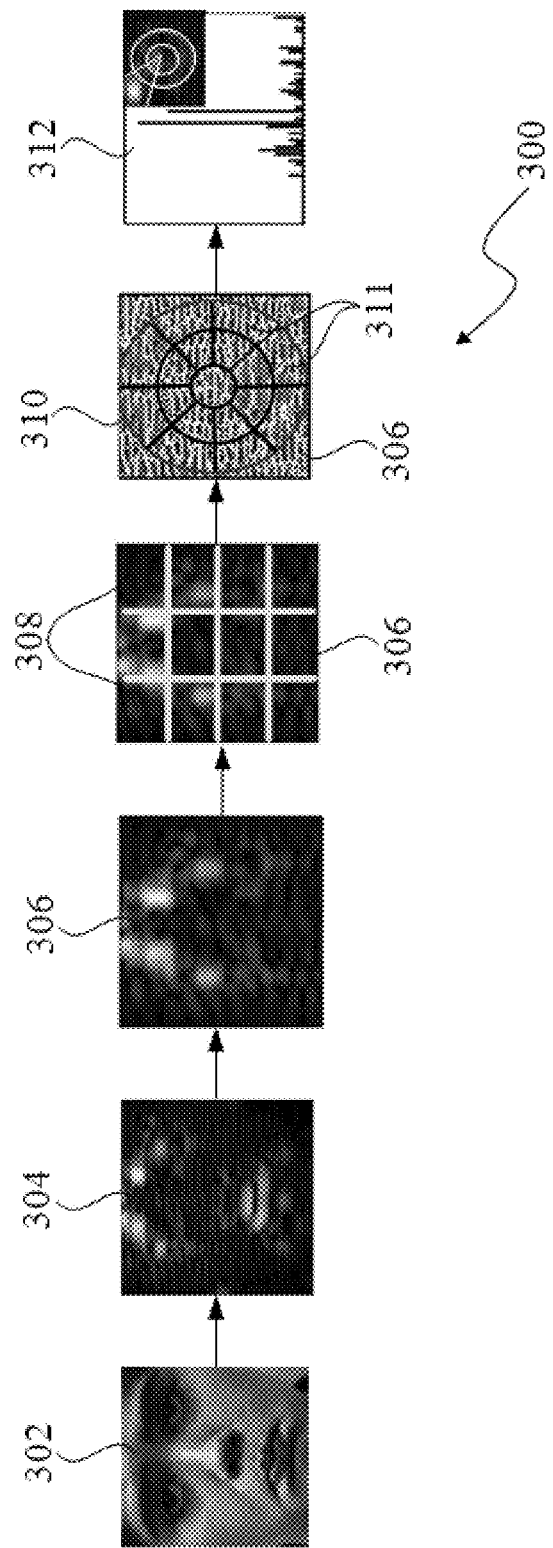
FIG. 3 illustrates a pictorial representation of a process of generating a facial descriptor from an input facial image, according to example embodiments.

FIG. 3 illustrates a pictorial representation of a process 300 of generating a facial descriptor from an input facial image, according to example embodiments. Consider that a facial image 302 is input for generating facial descriptor of the facial image. The facial image 302 is processed to generate gradient based images 304 with M scales and N orientations. A portion 306 of each gradient based image 304 for a particular action unit is cropped and codes are assigned to pixels in the cropped portion 306 based on relative intensity of each pixel with respect to neighboring pixels. Then, the cropped portion 306 is divided into multiple blocks 308 of different shapes and a spin wheel structure 310 is constructed on top of each block 308 of the cropped portion 306. Thereafter, a histogram is computed for each spin wheel structure based on codes assigned to pixels within each segment 311 of the spin wheel structure 310. The histograms thus obtained are concatenated to form a final histogram 312 which represents facial image for the particular action unit.

FIG. 4 illustrates a computing device 400 for implementing one or more embodiments. FIG. 4 and the following discussion are intended to provide a brief, general description of the suitable computing environment in which certain embodiments of the inventive concepts contained herein may be implemented.

The computing device 400 may include a processor 402, memory 404, a removable storage 406, and a non-removable storage 408. The computing device 400 additionally includes a bus 410 and a network interface 412. The computing device 400 may include or have access to one or more user input devices 414, one or more output devices 416, and one or more communication connections 418, such as a network interface card or a universal serial bus connection, for example. The one or more user input devices 414 may be keyboard or a mouse, for example. The one or more output devices 416 may be a display, for example. The communication connections 418 may include mobile networks such as General Packet Radio Service (GPRS), Wireless Fidelity (Wi-Fi®), Worldwide Interoperability for Microwave Access (WiMax), and Long Term Evolution (LTE), for example.

The memory 404 may include volatile memory and/or non-volatile memory for storing a computer program 420. A variety of computer-readable storage media may be accessed from the memory elements of the computing device 400, the removable storage 406, and the non-removable storage 408. Computer memory elements may include any suitable memory device(s) for storing data and machine-readable instructions, such as read only memory, random access memory, erasable programmable read only memory, electrically erasable programmable read only memory, hard drive, and removable media drive for handling memory cards, for example.

The processor 402, as used herein, refers to any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 402 may also include embedded controllers, such as generic or programmable logic devices or arrays, application specific integrated circuits, single-chip computers, and smart cards, for example.

Embodiments may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 402 of the computing device 400. For example, a computer program 420 may include the feature descriptor generation module 422 stored in the form of machine readable instructions. The machine-readable instructions, which when executed by the processor 402, may cause the computing device 400 to perform functionalities of the feature descriptor generation module 422, according to the various embodiments. In some embodiments, the processor 102 may perform the method steps illustrated in FIGS. 1 and 2 upon executing the computer program in the form of feature descriptor generation module 422.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

The example embodiments have been described with reference to specific example embodiments; it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

What is claimed is:

1. A method of generating a feature descriptor for facial expression recognition, the method comprising:
    generating a plurality of gradient based images with different scales and orientations from a facial image;
    selecting a portion of an image corresponding to each action unit in each of the plurality of gradient based images;
    determining, by a processor, an appearance of at least one facial event in the selected portion of the image using coded appearance values; and
    determining a geometry of the at least one facial event in the selected portion of the image using a spin wheel structure to obtain a feature descriptor for each action unit for facial expression recognition.

2. The method of claim 1, wherein determining the appearance of the at least one facial event in the selected portion of the image comprises:
    computing a coded appearance value for each pixel in the selected portion of the image based on relative intensity of each pixel with respect to neighboring pixels, wherein the code assigned to each pixel is indicative of the appearance of the at least one facial event.

3. The method of claim 2, wherein determining the geometry of the at least one facial event in the selected portion comprises:
    dividing the selected portion into a pre-defined number of blocks of different shapes;
    constructing a spin wheel structure in each of the blocks, wherein the spin wheel structure comprises a plurality of segments, and wherein each of the segments comprises a set of pixels belonging to each respective block;
    generating a histogram for each of the segments in each spin wheel structure in the selected portion of the image based on the codes assigned to the set of pixels in each segment; and
    generating a concatenated histogram for the portion of the image from the histograms associated with the segments in each spin wheel structure in the selected portion of the image.

4. The method of claim 1, further comprising:
pre-processing the facial image using a Gaussian filter.

5. The method of claim 1, wherein computing the code for each pixel in the selected portion of the image comprises:
    computing a code for each pixel in the selected portion of the image by integrating relative information around each pixel.

6. An apparatus comprising:
a processor; and
a memory coupled to the processor, wherein the memory comprises a facial descriptor generation module, wherein the facial descriptor generation module instructs the processor to perform a method comprising:
    generating a plurality of gradient based images with different scales and orientations from a facial image;
    selecting a portion of an image corresponding to each action unit in each of the plurality of gradient based images;
    determining an appearance of at least one facial event in the selected portion of the image using coded appearance values; and
    determining a geometry of the at least one facial event in the selected portion of the image using a spin wheel structure to obtain a feature descriptor for each action unit for facial expression recognition.

7. The apparatus of claim 6, wherein the method further comprises:
    computing a coded appearance value for each pixel in the selected portion of the image based on relative intensity of each pixel with respect to neighboring pixels, wherein the code assigned to each pixel is indicative of the appearance of the at least one facial event.

8. The apparatus of claim 7, wherein the method further comprises:
    dividing the selected portion into a pre-defined number of blocks of different shapes;
    constructing a spin wheel structure in each of the blocks, wherein the spin wheel structure comprises a plurality of segments, and wherein each of the segments comprises a set of pixels belonging to each respective block;
    generating a histogram for each of the segments in each spin wheel structure in the selected portion of the image based on the codes assigned to the set of pixels in each segment; and
    generating a concatenated histogram for the portion of the image from the histograms associated with the segments in each spin wheel structure in the selected portion of the image.

9. The apparatus of claim 6, wherein the method further comprises:
    pre-processing the facial image using a Gaussian filter.

10. The apparatus of claim 6, wherein the method further comprises:
    computing a code for each pixel in the selected portion of the image by integrating relative information around each pixel.

11. A non-transitory computer-readable storage medium having executable program stored therein, that when executed by a processor of a computing device, cause the computing device to perform the method comprising:
    generating a plurality of gradient based images with different scales and orientations from a facial image;
    selecting a portion of an image corresponding to each action unit in each of the plurality of gradient based images;
    determining an appearance of at least one facial event in the selected portion of the image using coded appearance values; and
    determining a geometry of the at least one facial event in the selected portion of the image using a spin wheel structure to obtain a feature descriptor for each action unit for facial expression recognition.

12. The storage medium of claim 11, wherein the method further comprises:
    computing a coded appearance value for each pixel in the selected portion of the image based on relative intensity of each pixel with respect to neighboring pixels, wherein the code assigned to each pixel is indicative of the appearance of the at least one facial event.

13. The storage medium of claim 12, wherein the method further comprises:

dividing the selected portion into a pre-defined number of blocks of different shapes;
constructing a spin wheel structure in each of the blocks, wherein the spin wheel structure comprises a plurality of segments, and wherein each of the segments comprises a set of pixels belonging to each respective block;
generating a histogram for each of the segments in each spin wheel structure in the selected portion of the image based on the codes assigned to the set of pixels in each segment; and
generating a concatenated histogram for the portion of the image from the histograms associated with the segments in each spin wheel structure in the selected portion of the image.

14. The storage medium of claim 11, wherein the method further comprises:
pre-processing the facial image using a Gaussian filter.

15. The storage medium of claim 11, wherein the method further comprises:
computing a code for each pixel in the selected portion of the image by integrating relative information around each pixel.

16. A method of recognizing a facial expression of an image, the method comprising:
generating a plurality of gradient-based images from the image;
selecting a portion, corresponding to an action unit, from one of the plurality of gradient-based images;
determining, by a processor, an appearance of a facial event in the selected portion of the image using coded appearance values; and
determining a geometry of the facial event using a spin wheel structure to obtain a feature descriptor for the action unit.

17. A non-transitory computer-readable recording medium storing a program to implement the method of claim 16.

* * * * *